(12) United States Patent
DeFeraudy

(10) Patent No.: US 7,252,251 B2
(45) Date of Patent: Aug. 7, 2007

(54) METHOD FOR PRECONCENTRATION OF ORGANIC SYNTHETIC MATERIALS DERIVED FROM SHREDDING OF END-OF-LIFE DURABLE GOODS

(75) Inventor: Hugues DeFeraudy, Charentay (FR)

(73) Assignee: Galloo Plastics S.A., Halluin (FR)

( * ) Notice: Subject to any disclaimer, the term of this patent is extended or adjusted under 35 U.S.C. 154(b) by 93 days.

(21) Appl. No.: 10/519,928

(22) PCT Filed: Jun. 30, 2003

(86) PCT No.: PCT/FR03/02011

§ 371 (c)(1),
(2), (4) Date: Nov. 2, 2005

(87) PCT Pub. No.: WO2004/004997

PCT Pub. Date: Jan. 15, 2004

(65) Prior Publication Data

US 2006/0102524 A1    May 18, 2006

(30) Foreign Application Priority Data

Jul. 2, 2002    (FR) .................................. 02 08242

(51) Int. Cl.
*B03B 9/06*    (2006.01)
*B07B 13/00*    (2006.01)

(52) U.S. Cl. .............................. 241/24.18; 241/24.12; 241/24.15; 241/28; 241/75; 241/77; 209/21; 209/30; 209/133

(58) Field of Classification Search ............. 241/24.12, 241/24.15, 24.18, 28, 75, 77; 209/21, 30, 209/133
See application file for complete search history.

(56) References Cited

U.S. PATENT DOCUMENTS

| | | | |
|---|---|---|---|
| 3,941,684 A | 3/1976 | Bradbury et al. | |
| 4,077,847 A * | 3/1978 | Choi et al. ..................... | 201/21 |
| 5,184,780 A | 2/1993 | Wiens | |
| 5,513,807 A * | 5/1996 | Stricker ........................ | 241/23 |
| 5,522,554 A | 6/1996 | Blank et al. | |

(Continued)

FOREIGN PATENT DOCUMENTS

DE        195 26 791 A1    1/1997

(Continued)

OTHER PUBLICATIONS

International Search Report for PCT/FR2003/002011 dated Dec. 19, 2003.

(Continued)

*Primary Examiner*—Derris H. Banks
*Assistant Examiner*—Jason Y. Pahng
(74) *Attorney, Agent, or Firm*—McCarter & English, LLP

(57) ABSTRACT

Process for pre-concentration of recoverable polymer materials formed from residues from grinding consumer durable goods at the end of their lives such as automobiles, computer equipment and household appliances, consisting of treating the residue by steps in sequence consisting of screening, aeraulic separation, grinding and ultimate aeraulic separation, to eliminate the major part of contaminating materials from them, such as metals, glass, rubber, sand or others in order to obtain a fraction pre-concentrated in recoverable polymer materials by recycling.

Figure 1:
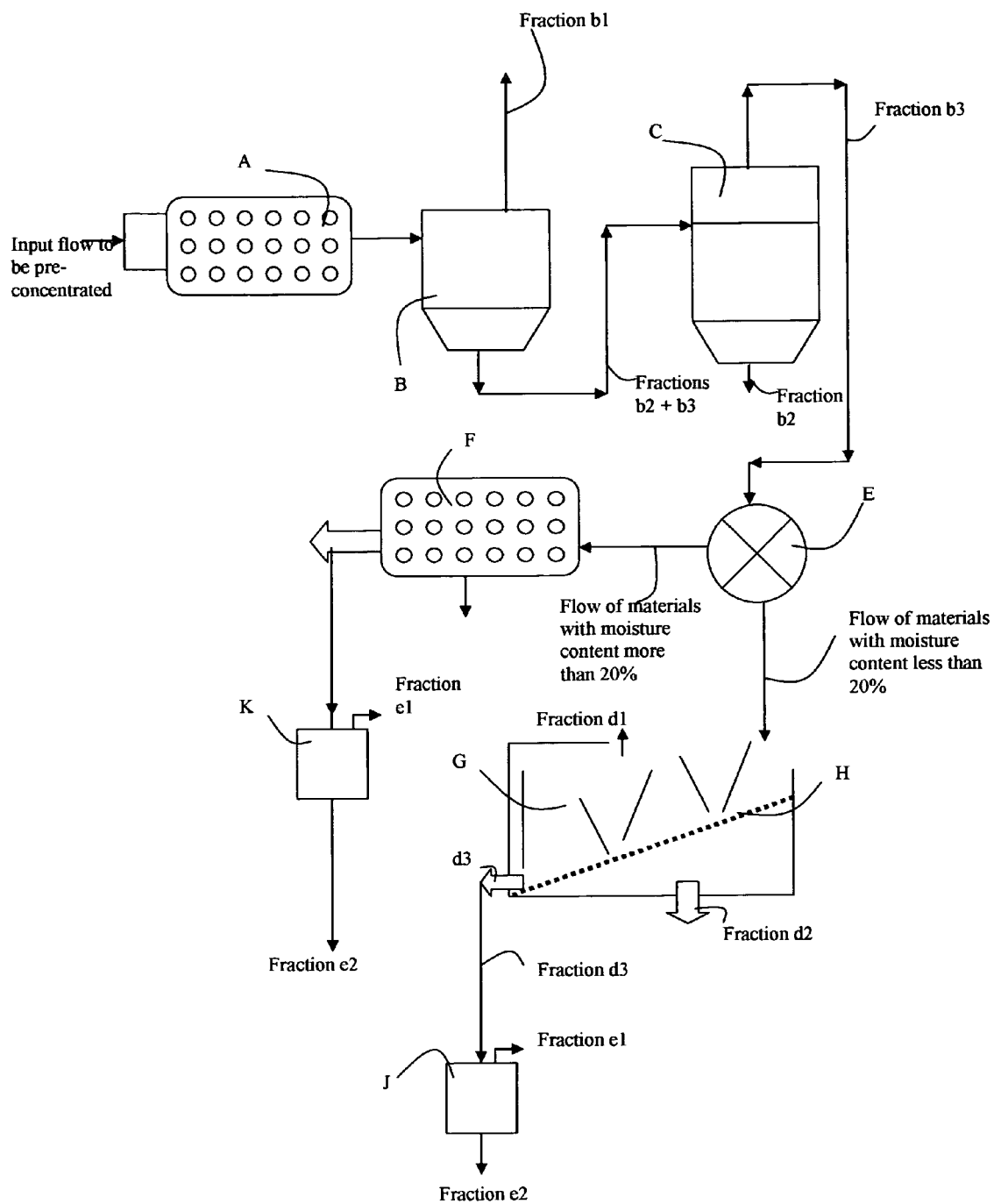

The pre-concentration process is a means of reaching preferably at least 85% by weight of recoverable polymer materials by recycling.

22 Claims, 1 Drawing Sheet

U.S. PATENT DOCUMENTS 5,630,553 A    5/1997    Serban et al.
6,024,226 A    2/2000    Olivier
6,335,376 B1    1/2002    Allen, III et al.

FOREIGN PATENT DOCUMENTS

| | | |
|---|---|---|
| DE | 199 53 208 A1 | 5/2000 |
| DE | 199 15 481 A1 | 10/2000 |
| EP | 0 639 406 A1 | 2/1995 |
| FR | 2 751 262 | 7/1996 |
| WO | WO 96/20819 | 7/1996 |
| WO | WO 98/01276 | 1/1998 |
| WO | WO 01/17742 A1 | 3/2001 |

OTHER PUBLICATIONS

French Search Report for FR 02/08242 date unknown.

* cited by examiner

METHOD FOR PRECONCENTRATION OF ORGANIC SYNTHETIC MATERIALS DERIVED FROM SHREDDING OF END-OF-LIFE DURABLE GOODS

FIELD OF THE INVENTION

The invention relates to a process for pre-concentration of recoverable synthetic organic materials such as synthetic polymer materials originating from the destruction of consumer goods by grinding at the end of their lives.

One important problem in recycling industries is the need to treat a wide variety of more or less polluting and polluted flows, with a variable concentration of various materials, some of which can be recovered. Industrial waste sorting equipment is specialised for processing a specific type of waste; this is why such equipment can only be efficient if it is supplied by a waste flow adapted to it, originating from collected waste or waste to be dumped without any processing.

Thus, in order to improve and maximise recovery of waste, flows to be treated input to sorting equipment specialised for a specific waste type have to be pre-concentrated in recoverable materials.

There are at least two objectives in the waste pre-concentration step:
- firstly to separate waste in order to direct it towards specialised treatment means,
- and to pre-concentrate a waste flow to be treated to improve the global efficiency of the waste treatment line by increasing the ratio between the "mass of recoverable products and the total mass of products entering the waste treatment line".

This is why the invention proposes a process for pre-concentrating a fraction of synthetic polymer materials to be recovered from residues originating from the destruction of consumer durable goods at the end of their lives, these residues containing recoverable synthetic organic materials and other materials, some of which are also recoverable and others of which form non-recoverable contaminating materials to be definitively disposed of.

More particularly, the invention relates to a process for extracting all synthetic polymer materials in a solid and expanded state with any composition whatsoever, present in a residue flow containing other materials considered to be contaminating materials such as metals, mineral materials and other contaminants, in order to reach a concentration ratio by weight of synthetic polymer materials equal to at least 60% and preferably at least 85%, and even better at least 90%. These pre-concentrated materials will subsequently be subjected to another separation and selection treatment in order to recover different fractions of homogenous synthetic polymer materials, and an extracted foam polymers fraction.

Flows for which the process according to the invention is applicable generally originate from residues from grinding of automobiles and consumer durable goods at the end of their lives, for which a large number of types of synthetic polymer materials should be considered to be recoverable and for which a large number of other materials are considered as being unwanted contaminants such as metals, mineral materials and various contaminating materials, and have to be disposed of. Other waste, such as mixed industrial waste containing synthetic polymer materials and packaging waste originating from municipal disposal dumps and also containing recoverable mixed polymer materials can equally be considered as being potentially recoverable.

STATE OF THE ART

The important problem facing recycling industries has been known for many years, and a relatively large amount of industrial research has been carried out, including some cases that have been selected to illustrate the state of the art for the field of the invention.

A first document (U.S. Pat. No. 6,024,226) describes a technology and a process for continuously separating and collecting materials originating from mixes of heterogeneous solid particles originating essentially from solid waste using a plurality of separation cells, each cell being filled with a liquid with a particular density different from the other cells.

A first separation cell receives the flow of heterogeneous materials to be sorted that is brought into contact with a first support liquid with a density of about 1.0, in which a first fraction of materials to be separated floats on the support liquid forming a lightweight fraction, while the remaining higher density fraction continues to flow forming a heavy fraction. This heavy fraction is recovered and input into a second separation cell, in which the density of the support liquid medium may be different from the density in the first cell, consequently introducing another separation into lightweight and heavy fractions.

The process mentioned above appears particularly suitable for the treatment of metallic fractions in order to recover non-ferrous materials, and the treatment of synthetic organic fractions, possibly purified in terms of their content of heavy synthetic organic materials (essentially chlorinated) for less polluting thermal reuse.

Another document (WO9801276) describes a process and a device for the treatment of mixed synthetic polymer material waste, particles that exceed a particular weight or a particular density (described as a heavy fraction) firstly being separated into lighter waste such as films and paper that are sucked in and managed differently. According to this patent, the heavy fraction of mixed rigid thermoplastic polymers is ground in two types of grinders and is then sieved to small dimensions of a few millimetres and then separated by screening and sorted by means such as suction and/or separation by electrostatic charges. Consequently, the treatment device comprises a grinding step, a sieving step and/or an electrostatic separation step. The flows of materials concerned to be treated are essentially more or less contaminated plastic packaging waste, for which a fraction has to be extracted for thermal reuse. Fine grinding and screening reduce the content of materials containing chlorine and inorganic materials.

Another document (DE19915481) describes a process for treatment of the lightweight fraction of grinding residues that includes a size reduction step by grinding, and a step to eliminate remaining ferrous metals and particles on which non-ferrous metals would remain attached. A second grinding step is performed to reduce the size of particles, followed by drying of the flow, separation of the dried flow from the largest lightweight organic fractions and recovery of these fractions. The remaining material is separated into at least two particle sizes by screening and sieving followed by separation in the form of an organic fraction and an inorganic fraction. The process requires that the entire initial flow of materials to be treated should be dried, which is potentially advantageous for thermal reuse, but is expensive and unnecessary for reuse of the constituent materials of these grinding residues.

Another document (DE19526791) describes a process and a device for separating metal and synthetic polymer mixes associated with each other and/or mixed, by steps to reduce the particle size, magnetic separation, screening, aeraulic classification and separation of non-ferrous materials from polymer materials. The initial process separates ground metals, by fluidised bed screening, this separation by classification making it possible to separate different fractions including a lightweight metallic fraction with no other fraction, a heavy metallic fraction, a lightweight materials fraction, a fraction of wire particles and a fraction of mixed polymer materials. The treatment unit includes a grinding step, a fines separation step, a transfer and fluidised bed classification step in order to perform all these separations. However, the final objective is to recover metallic fractions and not to pre-concentrate the fraction of synthetic polymer materials for reuse.

Another document (DE19953208) describes a process and an installation for separating mixed materials when dry, in particle form, using aeraulic technologies on a fluidised bed table.

Air suction and/or evacuation takes place through the fluidised bed. The density of the materials to be separated is equal to 0.8.

Another document (U.S. Pat. No. 6,335,376) describes a process for separation of polymer materials with or without additives, present in the form of a mix originating from various types of fragmented waste originating from the destruction by grinding of various consumable articles at the end of their lives. In particularly, this process concerns separation of polymer materials with densities very similar to each other and consists of modifying the physical characteristics of the said materials to modify the density of some of the materials to cause a differentiation between them and selective separation by apparent density. Thus, the document mentioned describes means of accentuating density differences of the polymer materials present, for example using the water adsorption capacity for each type of polymer that occurs differently depending on the various types of polymers present in the mix to be treated, and then subsequently transforming this adsorbed water by heating it to convert it into steam, this steam forming micro-bubbles and thus more or less intensely modifying the apparent density of the polymer materials thus treated, which can be separated. This is why the end purpose of this document is to attempt to make a fine separation of homogeneous fractions of polymers to be recycled, but this described process cannot pre-concentrate used synthetic polymer materials in order to:

optimally separate polluting waste from polymer material waste to be recovered, to direct the pre-concentrated flow towards treatment means specialised for used polymer material flows;

improve the global efficiency of specialised treatment means for these used polymer material flows.

Another document (WO01/17742) describes a waste flow treatment process consisting of polymer materials, household packaging and/or audio and video cassettes at the end of their lives.

In the case of this very specific waste, magnetic tapes which are thin films disturb the operation of treatment lines of such waste, particularly in the conveyors zone that is sensitive to the uncontrolled presence of these very long magnetic tapes. This is why the process proposes an industrial assembly comprising two grinding steps and two magnetic separation steps in which:

the first magnetic separation step must eliminate all metals present to protect the grinder, which subsequently dismantles audio and video cassettes to release the magnetic tapes;

the second magnetic separation step must retrieve the released magnetic tapes which are then agglomerated by heat treatment causing their shrinkage and subsequently agglomeration.

The process thus mentioned appears adapted only to the special treatment of these audio and video cassettes at the end of their lives firstly to recover polymer materials from them used for manufacture of the casings, and secondly polymer materials from which the magnetic tapes and films are made.

Thus, the state of the art describes various material sorting processes with the objective of selecting and/or extracting a mix of materials, or a particular material, or extracting a non-ferrous fraction of metallic materials from them or treating a fraction of thermoplastic polymer materials from various sources, to reduce their content in chlorinated polymers, to separate metallic materials and associated polymer or other materials. But the state of the art does not describe enrichment processes for the treatment of material flows with very widely varying compositions, such as materials originating from destruction by grinding of automobiles or consumer durable goods at the end of their lives.

Such flows contain metallic materials, mineral materials and organic materials with natural or synthetic source, for example such as synthetic polymer materials.

OBJECTIVES OF THE INVENTION

Many objectives are then applicable to the purpose of the invention, such that at least the major part of the perceptible disadvantages with the state of the art is eliminated.

A first purpose of the invention is to create a process and its corresponding industrial installation for pre-concentrating recoverable synthetic polymer materials of all types present in the flow of materials originating from grinding of consumer goods, and particularly automobile vehicles, at the end of their lives.

Another purpose of the invention is to create a process and a corresponding industrial installation that can be used for pre-concentration of recoverable synthetic polymer materials only present in the complex flow formed from waste originating from grinding of consumer durable goods at the end of their lives such as automobiles, household appliances, electrical and/or electronic articles after a simple initial treatment, by separation from other contaminating materials such as expanded polymer materials, metallic materials, mineral materials for example such as sand, glass, natural organic materials for example such as wood.

Another purpose of their invention is to create a process and a corresponding industrial installation that is capable of starting from the complex flow consisting of waste originating from grinding of consumer durable goods like those mentioned above, to produce a pre-concentration of compact recoverable polymer materials only, in other words materials free of expanded polymer materials with open or closed cells, for which the concentration of compact polymer materials that can be recovered at the end of the treatment using the process is equal to at least 60% and preferably 80% by weight, and this pre-concentration can then be efficiently treated appropriately in installations or using appropriate selection technologies to extract homogeneous polymer materials from them, with degrees of purity similar to degrees of purity of unused polymer materials, for each family of polymer materials present in the said flux.

Another purpose of the invention is to create a process and a corresponding industrial installation that is capable of starting from the complex flow consisting of waste originating from grinding of consumer durable goods, and producing another fraction of recoverable materials composed of flakes and flexible foams, particularly polyurethane foam with open cells.

BRIEF PRESENTATION OF THE INVENTION

According to the various purposes of the invention mentioned above, the process for treatment of a mix of fragmented materials originating from grinding of automobile vehicles and consumer durable goods such as household appliances at the end of their lives, reduces the disadvantages with the state of the art, and also provides substantial improvements in means described in the past.

According to the invention, the treatment process for a mix of materials originating from residues from grinding of consumable articles at the end of their lives into fragmented form, to pre-concentrate this mix into recoverable materials and at least partly eliminate materials contaminating the recoverable materials, the said mix to be treated comprising:
- a fraction of recoverable materials, consisting of non-expanded synthetic polymer materials with various nature and/or composition and/or shape factor, in the form of fragments varying from a rigid state to a flexible state,
- fractions of contaminating materials formed from mineral materials and/or metallic materials and/or organic materials other than non-expanded polymer materials and/or synthetic polymer materials in an expanded state, characterised in that it comprises:
- a) a first mechanical separation step by screening and/or shape factor to at least partly extract the fraction of contaminating mineral materials, from the mix of fragmented materials,
- b) an aeraulic separation step by gas flow, comprising one input for the mix of materials originating from step a), from which the mineral material fraction has at least partly been removed, and three outputs for extraction of separated material fractions in which the first fraction (b1) consists of a fraction of ultra-lightweight and/or expanded synthetic polymer materials, the second fraction (b2) consists of a fraction of heavy materials present in the mix and the third fraction (b3) consists of a fraction of synthetic polymer materials to be recovered, in fragmented form varying from a rigid state to a flexible state,
- c) a step to grind the fraction (b3) of recoverable polymer materials originating from step b), to the liberation mesh of contaminating materials included in, adhering to or assembled with fragments of the fraction of polymer materials to be recovered,
- d) a second mechanical separation step by screening and/or aeraulic separation by gas flow, separating the fraction of synthetic polymer materials to be recovered originating from the grinding step c) to at least partly eliminate the fraction of contaminating materials released during grinding and to extract the fraction of recoverable materials forming the required mix, pre-concentrated into recoverable materials, and still containing contaminants.

In order to be able to perceive the entire scope of the process according to the invention, it is important to define mixes of materials to be recovered (containing contaminating materials to be at least partly eliminated) making up the material flow input into the process according to the invention, and which at the output from the said process, gives the fraction of recoverable materials forming a pre-concentrated mix with at least 60% and preferably at least 85% of recoverable materials. Thus, the treatment process according to the invention for a mix of materials to be recovered in fragmented form, to obtain a mix of materials pre-concentrated in synthetic polymer materials (thermoplastic and/or thermosetting) to be recovered, is supplied from two flows <<I>> and <<II>> of grinding residues from automobiles and consumer durable goods such as household appliances and/or electronic equipment at the end of their lives. The largest dimension of these grinding residues is 250 mm, and preferably 200 mm.

The flows <<I>> and <<II>> may be used separately or mixed depending on the procedure used by the grinder (by campaign or continuous). Flow <<I>> is the fraction referred to in the business as "heavy non-suction" fraction at the output from the automobile and consumer durable goods grinder, separated or not separated from metals, and flow <<II>> is the lightweight suction flow known as fluffs at the output from the said grinder. Free metallic fragments can be separated from non-metallic parts using conventional magnetic techniques and by eddy current.

Flow <<I>> or the <<Heavies>> flow includes rubber and thermoplastic and thermosetting polymers that cannot be drawn in by suction, remainders of metals, inorganic materials, wood, etc., that passed through a separation screen with a 20-250 mm mesh size and preferably a 20 to 200 mm mesh size, and even better a 100 to 150 mm mesh size at the primary grinder, when grinding automobile and durable consumer goods.

Flow <<II>> or the <<Lightweight materials>> or <<fluff>> flow composed of thermoplastic and thermosetting materials is in the form of boards with heterogeneous dimensions, foam pieces and/or sheets, fabric adhering to substrates, threads, film waste.

Some vehicle and/or consumer durable goods grinders operate under water sprinkling to prevent risks of explosion and formation of dust that cause supplementary risks for the environment. Thus grinding residues do not have the same moisture content in different batches depending on the quantities of open cell foams, fibres and fabrics.

In particular, when open cell flexible foams, essentially polyurethane foams (from automobile seats) are saturated with water, it is preferable to treat them using appropriate processes that take account of their different characteristics and more precisely their apparent density and apparently they should be separated making use of their shape factor.

However, when residues are in a dry state, a first lightweight suction can be particularly useful to extract these open cell flexible foams.

Metals can be recovered in each step of the process for pre-concentration of the fraction of the synthetic organic materials using known means such as magnetic separation and separation by eddy current.

The process for pre-concentration of fractions of recoverable materials consisting of synthetic polymers is adapted to any existing system for grinding vehicles and/or consumer durable goods, regardless of the grinding technique used for destruction of these goods at the end of their lives.

The related process, technologies, equipment and pre-concentration installations are preferably placed on the site of the large automobile grinder, when automobile grinding residues are being treated.

To enable a good understanding of the various recoverable and contaminating materials making up the mix of materials to be submitted to the pre-concentration process according to the invention, originating from destructive grinding of consumer goods at the end of their lives, for example such as automobile vehicles, these various materials are sorted according to the following definitions:

heavy materials and lightweight materials: heavy materials form the heaviest fraction originating from the step of separation by real density or apparent density in the process according to the invention of the flow of materials being treated, in opposition to lightweight materials forming the lightweight fraction of the same flow.

Note that at least part of heavy materials in a separation step might become lightweight materials in a subsequent separation step, and vice versa; some of the lightweight materials in one step can be considered as heavy materials in the next separation step.

Ultra-lightweight materials: the first lightweight fraction of the treated material flow separated by density or apparent density is called the ultra-lightweight materials fraction. This ultra-lightweight materials fraction is composed particularly of foam, textiles, films, pieces of threads, these materials preferably being in a dry state with a density that increases as a function of the moisture content.

Ultra heavy materials: the first heavy fraction of the treated material flow separated by density or apparent density is called the ultra heavy materials fraction. This ultra heavy materials fraction is composed particularly of sand, metals, rubber, wood.

Synthetic polymer materials: corresponding to the part of the material flow being treated composed of thermoplastic and thermosetting recoverable polymers that can be extracted from grinding residues and recovered or recycled.

The fraction of organic materials to be recovered other than polymers is composed mainly of wood, organic textile waste, waste from threads or others.

The fraction of foam polymer materials is composed essentially of open cell foams and cellular closed cell foams such as polyurethane foams, elastomeric or non-elastomeric polymer materials for which an in-depth porophoric action has been carried out.

The fraction of contaminating materials is formed from metallic waste or particles, pieces of rubber, glass, gravel, sand, wood, polymer foam waste, film waste, waste from filaments of fabrics made of synthetic polymer materials or other waste that has to be eliminated.

DETAILED DESCRIPTION OF THE INVENTION

The process for pre-concentration in polymer materials due to the treatment of a mix of fragmented materials originating from residues from grinding of objects at the end of their lives, for example such as automobiles, household appliances, electronic equipment and formed from a wide variety of material fractions including polymer materials, metals, mineral materials and materials with organic source other than the polymer materials mentioned above, excluding expanded polymer materials, applies to all thermoplastic and thermosetting polymer materials to be recovered present in the above mentioned consumable objects at the end of their lives.

The process for pre-concentration of polymer materials in the mix of the various materials mentioned above, originating from grinding residues, consists of treating the said mix to at least partly eliminate contaminating non-recoverable materials formed from fractions of materials other than polymers to be recovered, by extraction; this elimination thus enriches the said mix of recoverable polymer materials by increasing their concentration.

Once pre-concentrated by at least partly eliminating contaminating non-recoverable fractions, the enriched mix of recoverable polymer materials can be treated by appropriate means departing from the scope of the invention.

With the process according to the invention, a first product can be extracted formed from recoverable polymer materials consisting of a mix of fragmented polymer materials and/or with a wide variety of very different chemical compositions, this mix possibly containing fractions of contaminating materials that will be eliminated later.

According to this process according to the invention, it is also possible to extract the fraction of expanded polymers, particularly the fraction of polymers formed from open cell foams making up one of the unwanted contaminants.

Step a) in the Process According to the Invention

According to the process for the treatment of a mix of materials according to the invention, step a) receives the entire flow of various fragmented materials in the form of a mix originating from grinding residues of objects at the end of their lives as described above. This step a) in the process according to the invention is a mechanical separation step by screening and/or shape factor that can be done using a device comprising a screening means such as a calibrated separation mesh adapted to the materials to be separated and more particularly to the shape of recoverable fragments.

One screening means adapted to the separation step a) may be chosen from among devices provided with a rotary drum with a calibrated mesh, a vibrating screen with a calibrated mesh or any other device provided with a calibrated separation means; the largest dimension of the calibrated mesh, or the calibrated separation means, is usually not more than 25 mm and is preferably between 1 mm and 15 mm.

For example, when carrying out step a), a mechanical separation by calibrated screening can be done using a trommel consisting of a cage with a cylindrical separation surface, with a slightly inclined axis of revolution, the calibrated mesh of the surface to be used for separation being formed by openings, in which the largest dimension is adapted to the dimension and/or the shape factor of the contaminating materials to be eliminated, such that:

Only recoverable polymer fractions in the form of platelets will be retained by the sorting mesh in the calibrated separation means with a minimum of contaminating materials for which the largest dimension and/or the shape factor are greater than the calibrated sorting mesh, The fractions of contaminating materials and recoverable materials for which the largest dimension and/or the shape factor are different from the values of fractions of recoverable polymers and for which the largest dimension and/or shape factor are less than the dimension of the calibrated sorting mesh, pass through the free space of the sorting mesh and are eliminated.

This first mechanical separation step by screening and/or shape factor eliminates a large fraction of contaminating materials essentially composed of mineral materials such as pieces of glass, gravel and sand that would disturb operation of subsequent steps and have to be eliminated. Synthetic polymer materials to be recovered are in a fragmentation state such that quantities eliminated during this screening step making up the losses are very small.

Step b) in the Process According to the Invention

The flow of materials originating from step a), in which this first fraction of contaminating materials has been eliminated, is input into step b) of the treatment process according to the invention. This step b) in the treatment process according to the invention is designed to selectively separate the different fractions of materials present in the flow of the various materials originating from step a) in the treatment process, these different fractions being composed of so-called ultra-lightweight, lightweight and heavy materials.

The fraction of ultra-lightweight materials b1) is formed from film waste, polymer waste, and waste from natural or synthetic threads and polymer foams.

The fraction of lightweight materials b3) is formed from all polymer materials to be recovered in a very wide variety of rigid and flexible fragmented forms such as boards, scale, flakes, powder.

The fraction of heavy materials b2) may contain natural or synthetic organic materials such as wood, rubber or other waste, mineral materials such as sand and glass residues for which the dimensions and/or shape factors were inoperative in the previous step a) for separation by screening and metallic residues for which the dimensions and/or shape factors were also inoperative in the said previous step a) for separation by screening.

The various ultra-lightweight, lightweight and heavy fractions in step b) into which the material flow from step a) is input, are separated aeraulically possibly by suction and/or blowing in an aeraulic separation zone comprising at least one aeraulic separation means operating by blowing and/or suction of a gas flow, this zone comprising an input of the mix of materials to be separated and three outputs used for extraction of the fraction (b1) of ultra-lightweight and/or expanded polymer materials to be eliminated, the fraction (b2) consisting of contaminating heavy materials to be eliminated and the fraction (b3) formed from polymer materials to be recovered and pre-concentrated.

In the case in which the aeraulic separation zone in step b) according to the process according to the invention comprises a single aeraulic separation means, this aeraulic separation means comprises at least two specific separation zones. One of the specific aeraulic separation zones is also the zone that is used to supply materials to be separated in which the input flow is subjected to an advance aeraulic separation by gas flow of the fraction (b1) of ultra-lightweight materials to be eliminated while it is entering the said zone, and immediately at the exit from the said fraction (b1) from the aeraulic separation means. The other specific aeraulic separation zone provided with a screening means is also subjected to a gas flow, treats the mix of fractions of heavy and contaminating materials (b2) and lightweight and recoverable materials (b3) originating from the first specific zone, the gas flow separating and entraining the fraction (b3) of lightweight and recoverable materials by means of aeraulic separation, while the fraction (b2) of contaminating heavy materials is separated from fraction (b3) by gravity and is eliminated from the aeraulic separation means through an appropriate output. This type of aeraulic separation with two specific separation zones may be chosen from the group composed of modular separators-cleaners-calibrators comprising screens and double suction; for example the WESTRUP Company markets an aeraulic separator of this type.

If the aeraulic separation zone in step b) in the process according to the invention is composed of two aeraulic separation means that are aeraulic separators, the said separation means are then installed in series such that at least one output from the contaminating material fractions (b1) and (b2) is located on the first aeraulic separation means.

According to one variant related to the presence of two aeraulic separation means or gas flow aeraulic separators in the aeraulic separation zone, the first aeraulic separation means into which the input flow of materials to be separated into contaminating material and recoverable material fractions originating from step a) arrives, treats this flow in two fractions, such that the ultra-lightweight materials fraction (b1) is extracted through the top part of the first aeraulic separation means, while a mix of the fraction (b2) of contaminating heavy material and the fraction (b3) of lightweight materials to be recovered is extracted through the bottom part of the said aeraulic separation means. This mix of the fraction (b2) of contaminating heavy materials and the fraction (b3) of lightweight materials to be recovered is added into the second aeraulic separation means, the fraction of contaminating heavy materials (b2) being eliminated through the bottom part of the second aeraulic separation means while the fraction (b3) of materials to be recovered is extracted to be input to step c) in the process according to the invention.

According to another variant related to the presence of two aeraulic separation means or gas flow aeraulic separators in the aeraulic separation zone, the first aeraulic separation means into which the input flow of materials to be separated into contaminating and recoverable material fractions originating from step a) treats the flow in two fractions such that the fraction (b2) of contaminating heavy materials is extracted from the bottom part of the said aeraulic separation means while a mix of the fraction (b1) of contaminating ultra-lightweight materials and the fraction (b3) of recoverable lightweight materials is extracted from the upper part of the first aeraulic separation means. This mix of the contaminating ultra-lightweight materials fraction (b1) and the recoverable lightweight materials fraction (b3) is added into the second aeraulic separator, the fraction of ultra-lightweight contaminating materials (b1) being eliminated through the top part of the second aeraulic separation means, while the fraction of recoverable lightweight materials is extracted through the bottom part of the said separation means to supply step c) in the process according to the invention.

Regardless of whether the use of one or several aeraulic separation means is adopted in step b) in the process according to the invention, the fraction (b1) of ultra-lightweight contaminating materials extracted from the aeraulic separation zone may be subjected to an additional separation step by screening depending on their largest dimension and/or their shape factor to perform separation of a fraction formed from materials with dimensions smaller than the mesh size of the screen such as polymer powders, waste threads and/or films, small volumes of foam and a fraction composed of all foam flakes that would not pass through the screen meshes and to recover them by an appropriate operation such as glycolysis, mechanical agglomeration with the addition of a binder, or cryogenic grinding to produce organic fillers to be added into articles by means of thermoplastic or thermosetting polymers.

Step c) in the Process According to the Invention

The fraction (b3) of recoverable polymer materials originating from the aeraulic separation step b) in the process according to the invention, that still contains contaminating materials included in, adhering to or assembled with the polymer materials to be recovered, is added in step c) of the process according to the invention. This step c) consists of fine grinding of the said fraction to be recovered to reach at least the liberation mesh for contaminating materials included in the polymer materials to be recovered, in order to release the said polymer materials from all adhering, assembled or contained contaminating materials. This step of grinding down to at least the liberation mesh of contaminating materials leads to manufacturing and obtaining a necessary fine fragmentation resulting in polymer particles to be recovered with their largest dimension equal to not more than 50 mm, preferably not more than 25 mm, and even better between 1 mm and 15 mm.

Grinding in step c) in the process according to the invention may be done continuously in appropriate grinders known to those skilled in the art.

Step d) of the Process According to the Invention

At the exit from the fine grinding step c), the flow of the ground materials formed from recoverable polymer materials and contaminating materials released by grinding and that have to be eliminated, enters a mechanical separation step d) by screening and/or aeraulic separation by gas flow. However, although the release of rigid contaminating materials by grinding does not create a difficult subsequent separation situation, this is not the case for flexible materials, particularly polymer foams which are subjected to a compression phenomenon during grinding, in other words a volume reduction. At the exit from the fine grinding step c), the compressed foam particles tend to return to their initial volume at rest, and as soon as they are released, their shape factor becomes different from the shape factor of recoverable rigid materials in the form of finely ground polymer fragments.

However, the flow of finely ground materials output from step c) in the process according to the invention may be in a variable dryness state which, depending on whether the flow of materials output from step c) is rather dry or wet, may have an influence on the final step d) of the process according to the invention, the threshold value of the moisture content between the dry state and the wet state being equal to not more than 20% by weight.

If the flow of finely ground materials originating from step c) is relatively dry, the various ultra-lightweight, lightweight and heavy material fractions in this flow are separated aeraulically, by suction and/or blowing in an aeraulic separation zone comprising at least one aeraulic separation means operating by blowing and/or suction of a gas flow, this zone comprising an input of the mix of materials to be separated and three outputs through which a fraction (d1) of ultra-lightweight polymer and/or expanded materials to be eliminated, a fraction (d2) consisting of contaminating heavy materials to be eliminated and a fraction (d3) formed of polymer materials to be recovered, are extracted. This final fraction (d3) forms the flow of recoverable pre-concentrated materials resulting from the process according to the invention, preferably containing at least about 85% by weight of recoverable materials and not more than 15% by weight of contaminating materials.

If the aeraulic separation zone in step d) of the process according to the invention comprises a single aeraulic separation means, this separation means itself comprises at least two specific separation zones for the materials to be separated. One of the specific aeraulic separation zones is the zone that simultaneously supplies materials to be separated for which the input flow is subjected to an early aeraulic separation as it enters the said zone, and the fraction (d1) of ultra-lightweight materials to be eliminated are immediately removed in a gas flow. The other specific aeraulic separation zone, provided with a screening zone and also subjected to a gas flow, treats the mix of contaminating heavy materials fraction (d2) and the recoverable materials fraction (d3) originating from the first specific zone, the gas flow separating the recoverable materials fraction (d3) and entraining it to an aeraulic separator exit, while the contaminating heavy materials fraction (d2) is separated from the fraction (d3) by gravity and is eliminated from the aeraulic separation means through an appropriate exit. This type of aeraulic separation means or aeraulic separator with two specific separation zones may be chosen from the group composed of modular separators-cleaners-calibrators comprising screens and double suction; for example, the WESTRUP Company markets an aeraulic separator of this type.

If the aeraulic separation zone in step d) in the process according to the invention is composed of two aeraulic separation means, the said separation means are then installed in series such that at least one output from the contaminating material fractions (d1) and (d2) is located on the first aeraulic separation means.

According to one variant related to the presence of two aeraulic gas flow separation means in the aeraulic separation zone, the first aeraulic separation means that receives the input flow of materials to be separated into fractions of contaminating and recoverable materials output from step c), treats this flow in two fractions such that the ultra-lightweight materials fraction (d1) is extracted by the upper part of the first aeraulic separation means, while a mix of the fraction (d2) of contaminating heavy materials and the fraction (d3) of materials to be recovered is extracted through the lower part of the said aeraulic separation means. This mix of fractions of contaminating heavy materials (d2) and materials to be recovered (d3) is added into the second aeraulic separation means, the fraction of contaminating heavy materials (d2) being eliminated through the bottom part of the second aeraulic separation means, while the fraction (d3) of materials to be recovered is extracted in step d) and an additional step to eliminate contaminating materials may be carried out on them.

According to another variant related to the presence of two aeraulic gas flow separation means in the aeraulic separation zone, the first separation means into which the input flow of materials to be separated into contaminating and recoverable material fractions output from step c) enters, treats the flow in two fractions such that the contaminating heavy materials fraction (d2) is extracted through the bottom part of the said aeraulic separation means while a mix of the contaminating ultra-lightweight materials fraction (d1) and the recoverable materials fraction (d3) is extracted through the top part of the first aeraulic separation means. This mix of the contaminating ultra-lightweight materials fraction (d1) and the recoverable materials fraction (d3) is added into the second aeraulic separation means, the fraction of contaminating ultra-lightweight materials (d1) being eliminated through the top part of the second aeraulic separation means, while the recoverable materials fraction (d3) is extracted through the bottom part of the said separation means.

Regardless of whether one or several aeraulic separation means are used in step d) in the process according to the invention, the fraction of contaminating ultra-lightweight materials (d1) extracted from the aeraulic separation zone may be subjected to an additional separation step by screening as a function of their largest dimension and/or their shape factor to separate a fraction formed from materials with dimensions smaller than the size of the screen mesh such as polymer powders, thread and/or film waste, small foam volumes, and to recover all foam flakes that cannot pass through the meshes of the screen and to reuse them by an appropriate operation such as glycolysis, mechanical agglomeration with addition of a binder or cryogenic grinding to produce organic fillers that will be added into articles made using thermoplastic or thermosetting polymers.

In the case in which the flow of finely ground materials originating from step c) is relatively wet, in other words if it contains more than 20% of water by weight, the mechanical separation by screening and/or shape factor can be done using a device comprising a screening means such as a screen with a calibrated separation mesh adapted to the materials to be separated and more particularly to the shape of recoverable fragments.

One screening means adapted to execution of the separation step may be chosen from among devices provided with a rotary drum with calibrated meshes or a vibrating screen with calibrated meshes or any other device provided with a calibrated separation means; the largest dimension of the calibrated mesh is usually not more than 25 mm and is preferably between 1 mm and 10 mm.

When carrying out step d), a mechanical separation by calibrated screening would be possible, for example using a trommel with a cylindrical separation surface, with a slightly inclined axis of revolution, the calibrated mesh of the surface to be used for separation being formed from bars arranged along generating lines and bearing on circular structures coaxial with the axis of revolution of the said surface; the calibrated mesh is defined by the free space delimited by two bars and two contiguous circular structures such that:
- only recoverable polymer fractions in the form of platelets pass through this free space entraining a minimum amount of contaminating materials for which the largest dimension is less than the distance between two bars, these contaminating materials being foam, pieces of wood and other materials,
- the fractions of contaminating materials with a shape factor different from the shape factor(s) of recoverable polymer fractions or fractions for which the largest dimension is equal to at least the distance between two bars, are retained by the sorting mesh consisting of the bars and annular structures mentioned above; these contaminating materials thus eliminated are essentially foams, waste wood, cellular rubber and other materials.

This mechanical separation step by screening and/or shape factor eliminates a large fraction of polymer foams and other contaminating materials such as films and polymer threads, pieces of wood.

After this mechanical separation by screening, the fraction of recoverable polymer materials extracted from the treatment process according to the invention forms the pre-concentrated fraction of recoverable materials preferably as high as at least 85% by weight of recycled synthetic polymers to be recovered.

The fraction output from step d) pre-concentrated in synthetic polymer materials to be recovered and that is formed from a mix of synthetic polymers from various sources such as polyolefins, polyvinyl chloride, polystyrene, polyamide, polyesters, polyurethane or other polymers, some of which may contain a mineral filler, may be separated at the output from the pre-concentration process by density in an aqueous medium to select two fractions of polymers to be recovered delimited by a chosen density threshold "ds" for example equal to 1.1, the first fraction having a density less than ds and the second fraction having a density greater than or equal to ds. Depending on this separation density threshold ds, the first separated fraction is formed from a mix of polymer materials recoverable in an aqueous medium, in which each of them has a density of less than the value ds chosen as being the separation threshold for the two fractions; this first fraction may for example contain polyolefins, polystyrenes, elastomers or others. The other fraction is formed from a mix of recoverable polymer materials, each of which has a density equal to at least the value ds chosen as being the separation threshold, this other second fraction containing all recoverable polymer materials refused in the first fraction.

Thus, this method of separation of two fractions of mixed recoverable polymer materials, to make a selection delimited by a chosen density threshold ds, can be used to obtain two fractions separated by their density and each forming a pre-concentrated fraction of recoverable materials according to industrial needs. Each fraction of synthetic polymers to be recovered must subsequently be input to very fine selective separation processes in order to extract each polymer separately, for example a polyethylene fraction, a polypropylene fraction, a polystyrene fraction, a polyvinyl chloride fraction, a polyamide fraction and other fractions, these selective and fine separations being outside the scope of the pre-concentration process according to the invention.

The process according to the invention then includes a selection step by density separation in an aqueous medium with chosen threshold ds into two recoverable polymer fractions, starting from the flow d3) output from step d), and thus leads to the creation of two pre-concentrated fractions of preselected recoverable polymer materials, still containing contaminating materials.

Thus, according to the treatment process for a mix of materials originating from residues from grinding of consumable articles at the end of their lives into fragmented form, to pre-concentrate this mix into recoverable materials and at least partly eliminate materials contaminating the recoverable materials, the said mix to be treated comprising:
- a fraction of recoverable materials, consisting of non-expanded synthetic polymer materials with various nature and/or composition and/or shape factor, in the form of fragments varying from a rigid state to a flexible state,
- fractions of contaminating materials formed from mineral materials and/or metallic materials and/or organic materials other than non-expanded polymer materials and/or synthetic polymer materials in an expanded state, is characterised in that it comprises:
a) a first mechanical separation step by screening and/or shape factor to at least partly extract the fraction of contaminating mineral materials, from the mix of fragmented materials,
b) an aeraulic separation step by gas flow, comprising one input for the mix of materials originating from step a), from which the mineral material fraction has at least partly been removed, and three outputs for extraction of separated material fractions in which the first fraction (b1) consists of a fraction of ultra-lightweight and/or expanded synthetic polymer materials, the second fraction (b2) consists of a fraction of heavy materials present in the mix and the third fraction (b3) consists of a fraction of synthetic polymer materials to be recovered, in fragmented form varying from a rigid state to a flexible state, c) a step to grind the fraction (b3) of recoverable polymer materials originating from step b), to the liberation mesh of contaminating materials included in, adhering to or assembled with fragments of the fraction of polymer materials to be recovered, d) a second mechanical separation step by screening and/or aeraulic separation by gas flow, separating the fraction of synthetic polymer materials to be recovered originating from the grinding step c) to at least partly eliminate the fraction of contaminating materials released during grinding and to extract the fraction of recoverable materials forming the required mix, pre-concentrated into recoverable materials, and still containing contaminants.

e) a density separation step in an aqueous medium, separating the fraction of recoverable materials originating from step d) at a density threshold ds chosen to obtain two fractions of recoverable materials preselected based on the chosen density threshold ds and pre-concentrated in recoverable materials still containing contaminating materials.

The pre-concentration process according to the invention for fractions of synthetic organic materials as described in the context of the invention can be adapted to any grinding system for automobile vehicles and/or consumer durable goods at the end of their lives, regardless of the grinding technology used.

The invention will be better understood after reading the examples given for illustrative purposes and the block diagram (FIG. 1) for the pre-concentration process used in the context of the examples.

EXAMPLES

On an industrial grinding site for automobile vehicles at the end of their lives, after separation of the fraction consisting of various metals to be recovered, there are two material flows originating from this separation containing synthetic polymer materials to be recovered and contaminating materials to be eliminated available to be pre-concentrated according to the process according to the invention. These flows consist of a flow (I) consisting of a heavy fraction and a flow (II) consisting of a fraction of lightweight materials.

The composition of the two fractions making up the two input flows is given in the following tables. Contents are given as a % by weight.

Composition of the heavy fraction after ferrous and non-ferrous metals have been removed—flow (I)

| Material | Composition and size grading | Content (%) |
| --- | --- | --- |
| Polymers | All types, regardless of the shape of platelet and fragment, thermoplastic and thermosetting. | 19 |
| Rubber and elastomers | Pieces of tires (45%) All types of seals and gaskets (55%). | 55 |
| Metals | Fragment of ferrous and non-ferrous metals. | 5 |
| Wood |  | 7 |
| Textiles | Small parts. | 3 |
| Copper wires | Cables (5 to 15 cm). | 3 |
| Minerals | Stone and gravel, with weights up to 100-500 g per stone. | 8 |

Composition of the lightweight fraction, <<fluff>> extracted by suction—flow (II)

| Materials | Composition and size grading | Content (%) |
| --- | --- | --- |
| Polymers | All types, regardless of the shape of platelet and fragment, thermoplastic and thermosetting with dimension varying from 2 to 10 cm. | 9 |
| PU foam | 10/10-20/20 cm. | 8 |
| Rubber and elastomers | Long parts such as seals, gaskets, no components originating from tires. | 3 |
| Metals | Wires/aluminium platelets and other. | 2.5 |
| Copper wires | length: 10-20 cm. | 1 |
| Wood | Parts with dimensions 10-20 cm. | 1 |
| PU and textiles mix | Textiles, carpets, simulated leather, etc. | 32.5 |
| Minerals | Stones, sand, glass, dust, dirt. | 43 |

It must be understood that the given composition is an average that varies depending on the types of technology used for separation of flows (I) and (II), and depending on the types of composition of the product considered to be ground, namely automobiles and consumer durable goods such as household appliances at the end of their lives.

Example 1

According to the Figure

A test was carried out on 23.4 tonnes of the lightweight flow (II) or <<fluff>> output from an automobile grinder. This <<fluff>> corresponds to material extracted by the first suction from the grinder and is the flow input into the pre-concentration process as described in the context of the invention.

According to step a) in the process according to the invention, the input flow of materials was subjected firstly to selective mechanical separation by screening and/or shape factor in (A) in order to take out 3.68 tonnes representing 15% by weight of the input flow. The screen mesh size was 0-4 mm.

According to step b) of the process, the material flow output from step a) was subjected to separation by aeraulic sort in a first aeraulic separator (B). 10.14 tonnes of "lightweight materials" forming fraction b1) were thus extracted by suction and 9.58 tonnes corresponding to fractions b2) and b3) remained and are considered as "heavy materials", namely 43.3% of "lightweight materials" and 40.9% of "heavies" respectively. Almost all foams (99%) were sucked in the lightweight materials fraction (b1).

These 9.58 tonnes were input into a second aeraulic sort separator (C) and the fraction b3) of extracted synthetic polymer materials represents a mass of 4.1 tonnes, namely 17.5% of the initial total. This fraction is considered as being relatively clean. The fraction b2) composed of contaminating materials such as metals, rubber, minerals, wood and others, represented a mass of 5.48 tonnes that was extracted through the bottom of the second aeraulic separator.

According to step c) in the process, the 4.1 tonnes of fraction b3) were fragmented in the grinding zone (E), grinding being done on a 25 mm mesh.

At the output from the grinding zone (E), the 4.1 tonnes were input into an aeraulic separation zone by gas flow (suction) also comprising a screening means (H) for very efficient separation of polymer foams released in grinding in zone (E), due to their shape factor: (modular separation device marketed by the WESTRUP Company).

From this aeraulic separation and screening zone:
- a fraction (d3) representing 2.4 tonnes of recoverable synthetic polymer materials, essentially thermoplastics and a small amount of thermosetting materials, was extracted in the form of flakes, platelets and other ground materials representing 10.3% by weight of the total mass of the input flow into the process according to the invention;
- a fraction (d2) representing 0.22 tonnes of contaminating heavy materials formed from wood fragments, pieces of metal and electrical wires was eliminated by screening, representing 0.9% by weight of the total mass of the input flow into the process according to the invention;
- a fraction (d1) representing 1.48 tonnes of materials that could also be recovered was separated by suction comprising residual polymer foams, small pieces of rubber, thermoplastic and thermosetting polymer materials in the form of powder, flakes or platelets, representing 6.3% by weight of the total mass of the input flow into the process according to the invention;
- the concentration ratio of synthetic polymer materials increased from about 10% by weight of the total mass of the input flow into the process, to about 90% by weight in the fraction of recoverable synthetic polymers output from the pre-concentration process, due to the pre-treatment process.

The fraction d3, consisting of a mix of recoverable synthetic polymers output from step d) by treatment of this fraction, can be transformed into two fractions of pre-concentrated and preselected recoverable synthetic polymers, in a density separation step in an aqueous medium (j) with a chosen density threshold ds=1.1. This separation by a density threshold equal to 1.1 can give a first fraction e1 with a density of less than 1.1 containing particularly polyethylene, polypropylene, polystyrene and other polymer materials, and another fraction e2 with a density greater than or equal to 1.1 formed from a mix of recoverable polymer materials such as polyurethanes, polyamides, saturated or unsaturated polyesters, polyolefins with additives and others.

Synthetic polymer materials present in this pre-concentrate include rigid and flexible (most definitely rigid) polyvinyl chlorides (PVC), polypropylenes (PP) with density=0.9, high density polyethylenes (HDPE) and low density polyethylenes (LDPE) with density=0.92 to 0.95, copolymers—ethylene-vinyl-acetate (EVA), copolymers-ethylenes-propylenes, ethylene-propylene-rubber (EPR), ethylene-propylene-diene-monomer (EPDM), polyethylene foams (PE), polypropylene foams (PP), polyolefins with fillers with densities >1, polypropylenes (PP) with 20% talc and density=1.05, polypropylenes (PP) with 30% talc, filled polyethylene (PE), unfilled acrylonitrile butadiene styrene (ABS) with density=1.07, unfilled polystyrene (PS) with density=1.05, polycarbonates (PC), polyamides (PA), PA6 density=1.13, PA6.6 density=1.14, PA6.10 density=1.08, PA11 density=1.04, PA12 density=1.02, filled or not filled (with glass fibre or minerals), polymethyl methacrylate (PMMA) with density=1.18, unsaturated polyesters (PET) with density=1.10 to 1.3), saturated polyesters (PET) with density=1.2, filled or not filled with glass fibres, rigid or semi-rigid filled polyurethanes (PU) with density=1.21), rubber and other elastomers.

There are almost no polyurethane foams (PU) with density=0.02 to 0.035 present in this concentrated fraction since they were extracted separately.

Example 2

According to the Figure

A treatment complying with the pre-concentration process according to the invention was made on 33.94 tonnes of a flow II of lightweight materials and on 19.96 tonnes of a flow I of heavy materials formed from a mix of non-ferrous metals and polymer materials.

The mix of the heavy materials flow I and the lightweight materials flow II represents 53.9 tonnes and forms the input flow to the pre-concentration process.

According to step a) of the process according to the invention, the input flow was firstly subjected to a selective mechanical separation by screening and/or shape factor in (A) in order to extract 8.6 tonnes of fines, which is 15.94%. The screen mesh size was 0-4 mm.

According to step b) in the process, the material flow output from step a), in other words 45.35 tonnes, was separated by aeraulic sort in a first aeraulic separator (B). 8.54 tonnes of a "lightweight materials" fraction b1 was thus extracted by suction and 36.76 tonnes remained and are treated as "heavies" forming a mix of fractions b2 and b3), namely 15.8% of "lightweight materials" and 68.2% of "heavies" respectively. Almost all foams (99%) were removed by suction in the fraction of lightweight materials.

The 36.76 tonnes were transferred into a second aeraulic sort separator (C) and the extracted fraction of synthetic polymer materials b3) was increased to 16.9 tonnes, which is 31.35% of the initial total. This fraction b3) is the fraction containing the major part of recoverable polymer materials. The other fraction formed essentially of metallic contaminating materials represented 19.86 tonnes, which is 36.85% of the initial total.

According to step c) in the process, 16.9 tonnes in the synthetic polymer materials fraction b3) were fragmented in the grinding zone (E), the grinding being done on a 25 mm screen.

The 16.9 tonnes of ground materials at the output of the grinding zone (E) are input to a mechanical separation zone by screening or with a shape factor (F) to enable very efficient separation of polymer foams released from grinding in zone (E) due to their shape factor.

In this mechanical separation zone by screening and/or shape factor (F):
- 8.36 tonnes of a fraction formed by the mix of fractions (d2) and (d3) formed from recoverable synthetic polymer materials, essentially thermoplastics and a small amount of thermosetting and other contaminating heavy materials, were extracted in the form of flakes, platelets and other ground materials representing 15.5% by weight of the total mass of the input flow into the process according to the invention;

8.45 tonnes of a fraction (d1) of ultra-lightweight contaminating materials were eliminated.

After this mechanical separation by screening, the fraction of materials to be recovered d3 is subjected to a hydraulic separation step (J) in an aqueous medium with a density of 1.1, the threshold density ds chosen to enable selection according to two pre-concentrated fractions of synthetic polymer materials to be recovered. The fraction (e1) of recoverable polymer materials extracted from the treatment process according to the invention with a density of less than 1.1 represents 5.86 tonnes and forms a pre-concentrated and preselected fraction of recoverable polymer materials up to 90% of recycled synthetic polymers to be recovered. This fraction is formed essentially from recyclable polymer materials such as polypropylene, polyethylene, polypropylene filled with talc, polystyrene and ABS.

The other separated fraction e2 consisting of 1.13 tonnes with a density greater than 1.1, represents other recoverable polymer materials that were separated from fraction e1.

The invention claimed is:

1. Treatment process for a mix of materials originating from residues from grinding of consumable articles at the end of their lives into fragmented form, to pre-concentrate this mix into recoverable materials and at least partly eliminate materials contaminating the recoverable materials, the mix to be treated includes:
   a fraction of recoverable materials having non-expanded synthetic polymer materials with various natures and/or compositions and/or shape factors, in the form of fragments varying from a rigid state to a flexible state,
   fractions of contaminating materials formed from mineral materials and/or metallic materials and/or organic materials other than non-expanded polymer materials and/or synthetic polymer materials in an expanded state,
   the process comprising:
   a) mechanically separating by screening and/or shape factor to at least partly extract the fractions of contaminating mineral materials from the mix of materials,
   b) aeraulically separating by gas flow the mix of materials originating from step a) from which the mineral materials fraction has been at least partly removed so as to output a first fraction (b1) that includes a fraction of ultra-lightweight and/or expanded synthetic polymer materials, a second fraction (b2) that includes a fraction of heavy materials and a third fraction (b3) that includes a fraction of synthetic polymer materials to be recovered, in fragmented form varying from a rigid state to a flexible state,
   c) grinding the third fraction (b3) of recoverable polymer materials originating from step b), to a liberation mesh of contaminating materials included in, adhering to or assembled with fragments of the third fraction of polymer materials to be recovered,
   d) mechanically separating by screening and/or aeraulically separating by gas flow the third fraction of synthetic polymer materials to be recovered originating from the grinding step c) to at least partly eliminate the fraction of contaminating materials released during grinding and to extract a fraction of recoverable materials forming the required mix, pre-concentrated into recoverable materials, and still containing contaminants.

2. Process according to claim 1, separating the fraction of recoverable materials originating from step d) in an aqueous medium at a threshold density <<ds>> chosen to obtain two fractions of recoverable materials preselected based on the threshold density <<ds>> and pre-concentrated in recoverable materials still containing contaminating materials.

3. Process according to claim 1, wherein the mix of materials to be treated contains non-expanded thermoplastic and thermosetting synthetic polymer materials as recoverable materials to be pre-concentrated that originate from destructive grinding.

4. Process according to claims 1, wherein the fraction of recoverable materials are in the form of fragments for which the largest dimension is not more than 250 mm.

5. Process according to claims 1, wherein the mix of materials to be treated is subjected to separation by screening and/or shape factor according to step (d), a largest dimension of a screening mesh being equal to not more than 25 mm.

6. Process according to claim 5, wherein the separating by screening and/or shape factor is made in a calibrated separation mesh device, the calibrated separation mesh device includes a vibrating screen devices and rotating devices with a cylindrical separation surface.

7. Process according to claims 1, wherein the recoverable materials originating from step (a) from which some of the contaminating materials have been removed, are subjected to aeraulic separation by suction and/or blowing in a single aeraulic separation means comprising at least two specific aeraulic separation zones, the first specific aeraulic separation zone simultaneously supplying the means of aeraulic separation into a flow of materials to be separated for which the input flow is subjected to an early aeraulic separation as it enters the said zone with immediate separation of the first fraction (b1) of ultra-lightweight materials to be eliminated and the immediate output of the first fraction (b1) using the aeraulic separation means, the other specific aeraulic separation zone provided with a screening zone and also subjected to a gas flow that treats the mix of heavy and second fraction (b2) and the third fraction (b3) originating from the first specific zone, the gas flow separating the third fraction (b3) and entraining it to an exit from the aeraulic separation means, while the second fraction (b2) is separated from the third fraction (b3) by gravity and is eliminated from the aeraulic separation means through an appropriate exit.

8. Process according to claim 7, wherein the aeraulic separator with two specific separation zones includes modular separators-cleaners-calibrators comprising screens and double suction.

9. Process according to claim 1, wherein the recoverable materials originating from step (a) are subjected to aeraulic separation by suction and/or blowing into a first aeraulic separation means and a second aeraulic separation means installed in series.

10. Process according to claim 9, wherein the first aeraulic separation means receives an input flow of materials to be separated into fractions of contaminating and recoverable materials originating from step a), treats this flow in two fractions, such that the first fraction (b1) of ultra-lightweight materials is extracted through a top part of the said first aeraulic separation means, while a mix of the second fraction (b2) of contaminating heavy material and the third fraction (b3) of lightweight materials to be recovered is extracted through a bottom part of the the first aeraulic separation means, and is then added in the second aeraulic separation means, the second fraction (b2) of contaminating heavy materials being eliminated through the bottom part of the second aeraulic separation means while the third fraction (b3) of materials to be recovered is extracted from the second aeraulic separation means.

11. Process according to claim 9, wherein the first aeraulic separation means receives an input flow of materials to be separated into fractions of contaminating and recoverable materials originating from step a), treats the flow in two fractions such that the second fraction (b2) of contaminating heavy materials is extracted through a bottom part of the said the first aeraulic separation means while a mix of the first fraction (b1) of contaminating ultra-lightweight materials and the third fraction (b3) of recoverable lightweight materials is extracted through a top part of the first aeraulic separation means, and then a mix of the first fraction (b1) and the third fractions (b3) is added into the second aeraulic separation means, the first fraction (b1) of contaminating ultra-lightweight materials being eliminated through the top part of the said second aeraulic separation means, while the third fraction (b3) of recoverable lightweight materials is extracted through the bottom part of the first aeraulic separation means.

12. Process according to claim 1, further comprising screening the first fraction (b1) of contaminating ultra-lightweight materials extracted from the aeraulic separation zone by a largest dimension and/or a shape factor to separate a fraction formed from materials with dimension smaller than a mesh size of a screen such as polymer powders, thread and/or film waste, small volumes of foam and a fraction including of all foam flakes that would not pass through the screen meshes, and to recover them by an appropriate operation.

13. Process according to claim 1, further comprising fine grinding the third fraction (b3) of polymer materials to be recovered originating from the aeraulic separation step b), that still contains contaminating materials included in, adhering to or assembled with the polymer materials to be recovered, to reach at least the liberation mesh of contaminating materials contained in the polymer materials to be recovered, to release the polymer materials to be reused from all contaminating materials.

14. Process according to claim 13, wherein the liberation mesh of contaminating materials leads to at least fine fragmentation by grinding resulting in polymer particles to be recovered with a largest dimension equal to not more than 50 mm.

15. Process according to claim 1, wherein, when the flow of finely ground materials originating from step c) and input into step d) contains not more than 20% by weight of water, the first fraction, the second fraction, and the third fraction are separated aeraulically in a separation zone comprising at least one aeraulic separation means operating by blowing in and/or suction of a gas flow, the separation zone comprising an input of the mix of materials originating from step c) to be separated and three outputs through which a fraction (d1) of ultra-lightweight polymer and/or expanded materials to be eliminated, a fraction (d2) of contaminating heavy materials to be eliminated and a fraction (d3) formed of polymer materials to be recovered, this final fraction (d3) forming the flow of recoverable pre-concentrated materials.

16. Process according to claim 15, wherein, when the separating in step d) comprises a single aeraulic separation means, this separation means itself comprises at least two specific separation zones for the materials to be separated, one of the specific aeraulic separation zones being the zone that simultaneously supplies materials to be separated for which the input flow is subjected to an early aeraulic separation as it enters the said zone and immediate exit of the fraction (d1) of ultra-lightweight materials to be eliminated in a gas flow, the other specific aeraulic separation zone, provided with a screening surface and subjected to a gas flow, treats the mix of the fraction (d2) of heavy and contaminating materials and the fraction (d3) of recoverable materials originating from the first specific zone, the gas flow separating the lightweight recoverable materials fraction (d3) and entraining it to an exit from an aeraulic separation means, while the contaminating heavy materials fraction (d2) is separated from the fraction (d3) by gravity and is eliminated from the aeraulic separator through an appropriate exit.

17. Process according to claim 15, wherein, the separation zone comprises a first aeraulic separation means and a second aeraulic separation means, the first and second separation means are installed in series such that at least one output from the contaminating material fractions (d1) and (d2) is located on the first aeraulic separation means.

18. Process according to claim 17, wherein the first aeraulic separation means receives the input flow of materials to be separated into fractions of contaminating and recoverable materials originating from step c), treats this flow in two fractions such that the ultra-lightweight materials fraction (d1) is extracted through the top part of the first aeraulic separation means, while a mix of the fraction (d2) of contaminating heavy materials and the fraction (d3) of materials to be recovered is extracted through the bottom part of the said aeraulic separation means and the mix of fractions (d2) and (d3) is added into the second aeraulic separation means, the fraction of heavy materials (d2) being eliminated through the bottom part of the said aeraulic separation means, while the fraction (d3) of materials to be recovered is extracted from step d) to form the fraction pre-concentrated in polymer materials to be recovered.

19. Process according to claim 17, wherein the first separation means into which the input flow of materials to be separated into fractions of contaminating and recoverable materials originating from step c) treats the flow in two fractions such that the fraction of contaminating heavy materials (d2) is extracted through the bottom part of the said first aeraulic separation means, while a mix of the fractions of contaminating ultra-lightweight materials (d1) and recoverable materials (d3) is extracted through the top part of the said first aeraulic separation means and this mix of ultra-lightweight contaminating materials (d1) and recoverable materials (d3) is then added into the second aeraulic separation means, the fraction of contaminating ultra-lightweight materials (d1) being eliminated through the top part of the second aeraulic separation means, while the recoverable materials fraction is extracted through the bottom part of the said separation means to form the fraction pre-concentrated in polymer materials to be recovered.

20. Process according to claim 1, wherein, when the finely ground materials flow originating from step c) and input into step d) contains not less than 20% by weight of water, a mechanical separation by screening and/or shape factor can be done using a device with a screening means adapted to the shape of fragments of recoverable materials.

21. Process according to claim 20, wherein the screening means is a screen with a calibrated separation mesh, the largest calibrated mesh dimension being equal to not more than 25 mm.

22. Process according to claims 1, wherein the extracted fraction of recoverable polymer materials preferably contains at least 85% by weight of the said recoverable polymer materials.

* * * * *